(12) United States Patent
Capron et al.

(10) Patent No.: US 10,107,680 B2
(45) Date of Patent: Oct. 23, 2018

(54) QUANTUM SIGNAL DETECTION SYSTEMS AND METHODS

(71) Applicant: The Boeing Company, Chicago, IL (US)

(72) Inventors: Barbara A. Capron, Sammamish, WA (US); Benjamin E. C. Koltenbah, Federal Way, WA (US); Claudio Parazzoli, Seattle, WA (US)

(73) Assignee: The Boeing Company, Chicago, IL (US)

( * ) Notice: Subject to any disclaimer, the term of this patent is extended or adjusted under 35 U.S.C. 154(b) by 552 days.

(21) Appl. No.: 14/994,912

(22) Filed: Jan. 13, 2016

(65) Prior Publication Data

US 2017/0199077 A1    Jul. 13, 2017

(51) Int. Cl.
| | |
|---|---|
| *H01J 40/14* | (2006.01) |
| *G01J 1/44* | (2006.01) |
| *G01S 7/491* | (2006.01) |
| *G01S 13/32* | (2006.01) |
| *G01S 7/481* | (2006.01) |

(52) U.S. Cl.
CPC .............. *G01J 1/44* (2013.01); *G01S 7/481* (2013.01); *G01S 7/4917* (2013.01); *G01S 13/32* (2013.01)

(58) Field of Classification Search
CPC .......... G01J 1/44; G01S 7/4916; G01S 7/4917
USPC .............................................. 250/214.1, 221
See application file for complete search history.

(56) References Cited

U.S. PATENT DOCUMENTS

| | | | | |
|---|---|---|---|---|
| 5,574,553 | A | * | 11/1996 | McManamon ........ H04B 10/61 356/28.5 |
| 2012/0288065 | A1 | * | 11/2012 | Graves ..................... H05G 2/00 378/119 |

OTHER PUBLICATIONS

Agarwal, et al., "Nonclassical properties of states generated by the excitation on a coherent state," Phyiscal Review A, vol. 43, No. 1, pp. 492-497, The America Physical Society (1991).
Jiang, e al., "Super-Resolving Quantum Radar: Coherent-State Sources With Homodyne Detection Suffice to Beat the Diffration Limit," arXiv:1305.4162v3 [quant-ph], Feb. 17, 2014.

\* cited by examiner

*Primary Examiner* — Kevin Pyo
(74) *Attorney, Agent, or Firm* — Joseph M. Butscher; The Small Patent Law Group, LLC

(57) ABSTRACT

A quantum signal detection system includes a signal source configured to emit a transmit signal towards a target, and a photon adder that is configured to add at least one photon to a return signal that reflects from the target to form a combined signal. The combined signal increases a signal to noise ratio of the return signal.

20 Claims, 3 Drawing Sheets

QUANTUM SIGNAL DETECTION SYSTEMS AND METHODS

FIELD OF THE DISCLOSURE

Embodiments of the present disclosure generally relate to quantum signal detection systems and methods.

BACKGROUND OF THE DISCLOSURE

Homodyne signal detection systems and methods detect frequency-modulated radiation by mixing a signal with a reference signal. For example, a laser beam may be split into two portions. One portion is transmitted to a target, while another portion is a reference signal that is compared to a return signal that reflects from the target.

A typical homodyne detection system determines a location of a target by detecting a phase difference between two light beams having the same wavelength. In contrast, A typical heterodyne detection systems determines a location of a target by detecting a frequency difference between two light beams.

Light detection and ranging (LIDAR or LADAR) systems may be used to detect surface features of a target, such as various areas on the surface of the Earth. A typical LIDAR system includes a laser, a scanner, and a detector. The laser emits light pulses that are used to measure distances with respect to various areas of a particular target. The scanner moves the light pulses over the surface of the target. The light pulses reflect off the target and are received by the detector. The reflected light pulses received at the detector may be used to generate three-dimensional information about the surface shape and area of the target. Similarly, radio detection and ranging (RADAR) systems use radio waves to determine a range, angle and/or velocity of a target. LIDAR and RADAR may be homodyne or heterodyne based systems.

Resolution of known active measurement systems, such as LIDAR systems, is typically limited, due to the noise at a fundamental frequency level. For example, a known LIDAR system may use homodyne detection in which a coherent signal is transmitted to a target. The signal is scattered from the target and returns to a detector. Prior to arriving at the detector, the weakened return signal is combined with a stronger coherent signal. However, quantum noise (for example, vacuum noise) inherent within such a system decreases the clarity and resolution of the detected signal.

SUMMARY OF THE DISCLOSURE

A need exists for a quantum signal detection system and method having increased resolution. A need exists for a quantum signal detection system and method that increases a signal to noise ratio.

With those needs in mind, certain embodiments of the present disclosure provide a quantum signal detection system that is configured to detect a target. The quantum signal detection system may include a signal source configured to emit a transmit signal towards the target, and a photon adder that is configured to add at least one photon to a return signal that reflects from the target to form a combined signal. The combined signal increases a signal to noise ratio of the return signal.

The quantum detection system may also include a beamsplitter that is configured to mix the combined signal with a reference signal. The transmit signal and the reference signal may be mutually coherent. In at least one embodiment, the reference signal is emitted by the signal source. The transmit signal may be or include a homodyne transmit signal. Optionally, the transmit signal may be or include a heterodyne transmit signal.

In at least one embodiment, the transmit signal may be or include a coherent laser signal. In at least one other embodiment, the transmit signal may be or include a coherent radio frequency signal.

The photon adder may include a parametric amplifier or downconverter. Optionally, the photon adder may include a cavity having one or more atoms that are configured to interact with the return signal.

The photon adder may be disposed between a mirror and a beamsplitter. Optionally, the photon adder may be disposed between a beamsplitter and a signal detector. In at least one other embodiment, the photon adder may be disposed between two mirrors.

Certain embodiments of the present disclosure provide a quantum signal detection method of detecting a target. The quantum signal detection method may include emitting a transmit signal towards the target, receiving a return signal that is reflected from the target, and adding at least one photon to the return signal to form a combined signal. The adding operation increases a signal to noise ratio of the return signal.

DETAILED DESCRIPTION OF THE DISCLOSURE

Figure 1:
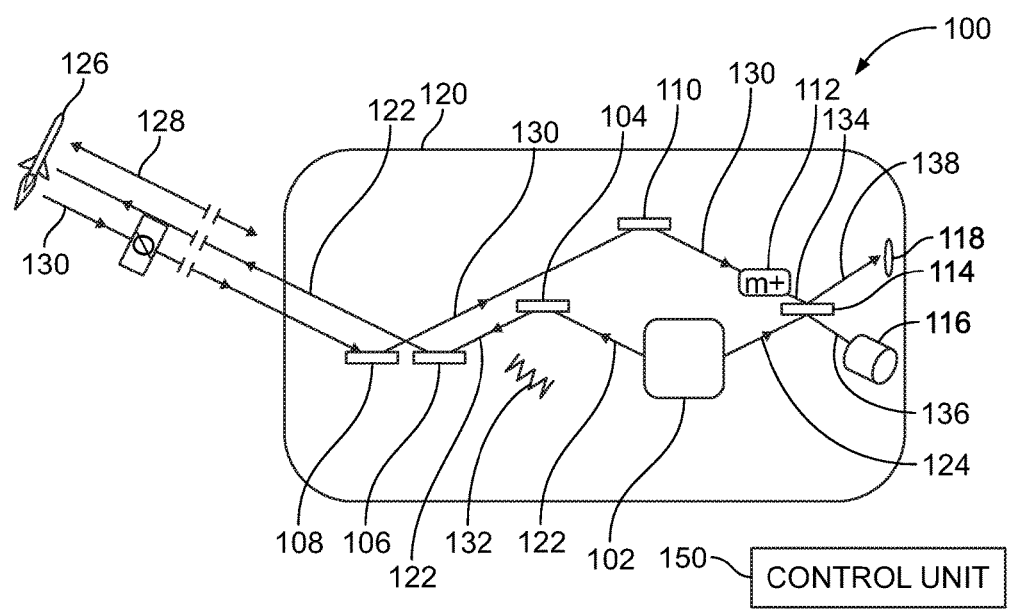
FIG. 1 illustrates a schematic diagram of a quantum signal detection system, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a quantum signal detection system and method, such as a quantum LIDAR or RADAR, that may include a receiver or detector (such as a homodyne or heterodyne receiver), in which a return signal undergoes a process that changes photon statistics thereof prior to detection. A weak return signal may be combined with a stronger local source, which may emit a reference signal that is stronger than the return signal. After the combination, a process is applied to modify the photon statistics of the return signal. For example, one or more photons may be added via a parametric amplifier or downconverter. In at least one other embodiment, the return signal may be mixed with atoms in a cavity, chamber, or other interaction region. Such processes change the statistics of the return signal. It has been found that such process improves the signal to noise ratio of the light signal, provides increased signal resolution, and improves range and phase measurements.

Certain embodiments of the present disclosure provide a quantum signal detection system and method that may alter photon statistics of a return signal and thereby reduce the noise of the signal, or otherwise increase the signal to noise ratio of the signal. In quantum optics, photon addition changes the photon statistics of a beam and may change the noise statistics. In an active imaging system (such as a LIDAR system), light from a coherent source is sent to a target, and scatters off the target. A return signal that is weaker than the transmit signal reflects back towards the imaging system. The return signal may be combined with a stronger reference signal emitted by a local source and mixed on a beam combiner (such as a beamsplitter). If homodyne detection is being used, two outputs from the beam combiner may be subtracted from one another or examined separately. Prior to detection, the quantum or photon statistics of the return signal are modified. In at least one embodiment, the statistics may be modified through addition of at least one photon to the return signal, such as through a parametric amplifier or downconverter. In at least one embodiment, the statistics may be modified by mixing the return signal in a cavity having atoms. The change of excitation state of the atoms causes the photon statistics of the beam to change.

FIG. 1 illustrates a schematic diagram of a quantum signal detection system 100, according to an embodiment of the present disclosure. The quantum signal detection system 100 may be a LIDAR (or LADAR) or RADAR system, for example. The quantum signal detection system 100 may include a signal source 102, one or more mirrors 104, 106, 108, 110, a photon adder 112, a beamsplitter 114, a dump 116, and a signal detector 118. The components of the quantum signal detection system 100 may be contained within a housing 120. Optionally, the components of the quantum signal detection system 100 may not be contained within a housing.

The signal source 102 may be a coherent radiation source that is configured to emit coherent photons. For example, the signal source 102 may be a coherent light source, such as a laser. In at least one other embodiment, the signal source 102 may be a coherent beam source, such as an antenna transmitting radio frequency signals.

Each mirror 104, 106, 108, and 110 is configured to reflect a signal, such as a light signal. The mirrors 104, 106, 108, and 110 may be configured to fully reflect light signals. More or less mirrors at various other angles in relation to the signal source 102 and the signal detector 118 other than shown may be used.

The photon adder 112 may be a parametric amplifier, downconverter, or housing having a cavity containing atoms. The photon adder 112 is configured to expose one or more excited atoms to a return signal. The excited atom(s) interacts with the return signal to generate one or more photons.

The beamsplitter 114 may be an optical device that is configured to split a beam of light into two components. Accordingly, the quantum signal detection system 100 may be or include an interferometer, in which optical or radio waves are compared, superimposed, or otherwise analyzed. In at least one embodiment, the beamsplitter 114 may be a partially coated mirror that allows a portion of light to pass therethrough, while reflecting a remaining portion of the light. In at least one embodiment, the beamsplitter 114 may be partially coated with silver.

The signal detector 118 may be a photodetector, photosensor, or photocounter, for example. In at least one embodiment, the signal detector 118 may be a photodetector, such as one or more photodiodes, photovoltaic cells, or the like that convert radiant energy into an electrical signal via the photoelectric effect.

In operation, the signal source 102 emits a transmit signal 122 towards the mirror 104. Concurrently, the signal source 102 emits a reference signal 124 towards the beamsplitter 114. Alternatively, the signal source 102 may emit the reference signal 124 before or after the transmit signal 122 is emitted. The reference signal 124 may be a fraction of the strength of the transmit signal 122. For example, the reference signal 124 may have a strength that is 5% of the transmit signal 122. In at least one other embodiment, the reference signal 124 may have a strength that is 10% that of the transmit signal 122. In at least one other embodiment, the reference signal may have a strength that is 1% that of the transmit signal 122. Optionally, the reference signal 124 may have a strength that is greater or less than 1% (or 5% or 10%) of the transmit signal 122.

The transmit signal 122 reflects off the mirror 104, which redirects the transmit signal onto the mirror 106. The mirror 106 reflects the transmit signal 122 towards a target 126, which is a distance 128 from the system 100. For example, the mirror 106 may redirect the transmit signal 122 through an aperture formed through the housing 120 towards the target 126. The transmit signal 122 impinges on the target 126, and scatters. A return signal 130 reflects from the target 126. The return signal 130 is generally weaker than the transmit signal 122, due to the scattering and the distance to the target 126. As the return signal 130 reflects back from the target 126, the phase D changes with respect to the transmit signal 122.

The return signal 130 reflects back to the system 100 from the target 126 and is reflected from the mirror 108 towards the mirror 110. The return signal 130 then reflects off the mirror 110 towards the beamsplitter 114.

As shown, the photon adder 112 may be disposed between the mirror 110 and the beamsplitter 114. Quantum or vacuum noise 132 may be inherently generated within the system 100. For example, operation of the system 100 may inherently generate the quantum noise 132. The photon adder 112 adds one or more photons 112 to the return signal 130 before the return signal 130 is detected by the signal detector 118. In doing so, the photon adder 112 improves the signal to noise ratio of the return signal 130, which allows the signal detector 118 to clearly detect a high resolution signal despite the presence of the quantum noise 132.

The photon adder 112 may be or include a parametric amplifier, downconverter, and/or a cavity including one or more atoms. As the return signal 130 passes through the photon adder 112, the return signal 130 excites one or more atoms within the photon adder 112, thereby generating at least one photon. For example, interaction of the return signal 130 with the photon adder 112 may generate 1 photon, 2 photons, 5 photons, 10 photons, or more.

A combined signal 134, which includes the return signal 130 and one or more photons added thereto, passes through the photon adder 112 and impinges upon the beamsplitter 114. The beamsplitter 114 mixes the combined signal 134 with the reference signal 124 to form an amplified signal. An undetected portion 136 of the amplified signal may pass into the dump 116, while a detected portion 138 of the amplified signal impinges on the signal detector 118.

In a homodyne detection system, the signal detector 118 may compare the phase shift Φ of the return signal within the detected portion 138 of the amplified signal with respect to the phase of the reference signal 124 in order to determine a position of the target 126. In a heterodyne detection system, the signal detector 118 may compare a frequency shift of the return signal within the detected portion 138 of the amplified signal with respect to the frequency of the reference signal 124 in order to determine a position of the target 126.

In a homodyne system a target range L is given by $L=\phi\lambda/(2\pi)$, in which $\phi$ is the measured phase shift, and $\lambda$ is the laser wavelength. In a heterodyne (frequency modulated) system, the frequency shift is used to determine the target range.

The addition of the photon(s) to the return signal 130 improves the signal to noise ratio of the return signal 130. As such, the combined signal 134 is amplified over the quantum noise 132, and therefore effectively relatively reduces the quantum noise 132 within the system 100. For example, the addition of the photon amplifies the return signal 130 relative to the quantum noise 132. It has been found that the addition of one or more photons to the return signal 130 via the photon adder 112 alters the quantum statistics of the return signal 130. The addition of one or more photons to the return signal 130 effectively amplifies the weak return signal 130, while at the same time not increasing or amplifying the quantum noise 132 within the system 100. As such, the signal to noise ratio of the return signal 130, through addition of the photon(s) to form the combined signal 134, is increased. By adding the photon(s) to the return signal 130, the distribution of the return signal 130 is changed, and the phase information of the return signal 130 is unaffected.

Embodiments of the present disclosure provide a quantum signal detection system 100 that enhances a range of a Quantum LIDAR. For example, because the signal to noise ratio of the combined signal 138 is increased, the quantum signal detection system 100 may be used in a quantum LIDAR or RADAR system that may detect targets 126 that are further away than currently known systems.

As shown in FIG. 1, the photon adder 112 is disposed between the mirror 110 and the beamsplitter 114. Optionally, the photon adder 112 may be disposed between the mirror 108 and the mirror 110. In at least one other embodiment, the photon adder 112 may be disposed between the beamsplitter 114 and the signal detector 118. Further, additional photon adders may be used. For example, in addition to the photon adder 112 shown in FIG. 1, another photon adder may be disposed between the mirror 108 and the mirror 110, and/or between the beamsplitter 114 and the signal detector 118.

As noted above, the signal source 102 may be a coherent radiation source (such as a laser) that is configured for homodyne or heterodyne emission and detection. The transmit signal 122 and the reference signal 124 may be mutually coherent. For example, the transmit signal 122 and the reference signal 124 may be emitted having the same frequency and the same phase. The signal source 102 may be a single source, such as a single laser source. In at least one other embodiment, separate and distinct signal sources may be used to emit the transmit signal 122 and the reference signal 124. Further, instead of the dump 116, an additional signal detector may be used.

The quantum signal detection system 100 may include a control unit 150 that is configured to control operation. The control unit 150 may be communicatively coupled to the signal source 102, the photon adder 112, and the signal detector 118, such as through wired or wireless connections. The control unit 150 may be configured to control the signal source 102 to emit the transmit signal 122 and the reference signal 124. Further, the control unit 150 may be configured to control the photon adder 112 to add a predetermined number of photons (such as 1 photon) to each return signal 130 reflected from the target 126. Also, the control unit 150 may be configured to receive data from the detector (such as photon counts) and analyze the portion 138 of the amplified signal to determine a position of the target 126 in relation to the system 100. Optionally, the quantum signal detection system 100 may not include the separate and distinct control unit 150.

As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 150 may be or include one or more processors that are configured to control operation of the quantum signal detection system 100.

The control unit 150 is configured to execute a set of instructions that are stored in one or more storage elements (such as one or more memories), in order to process data. For example, the control unit 150 may include or be coupled to one or more memories. The storage elements may also store data or other information as desired or needed. The storage elements may be in the form of an information source or a physical memory element within a processing machine.

The set of instructions may include various commands that instruct the control unit 150 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 150. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 150 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 2:
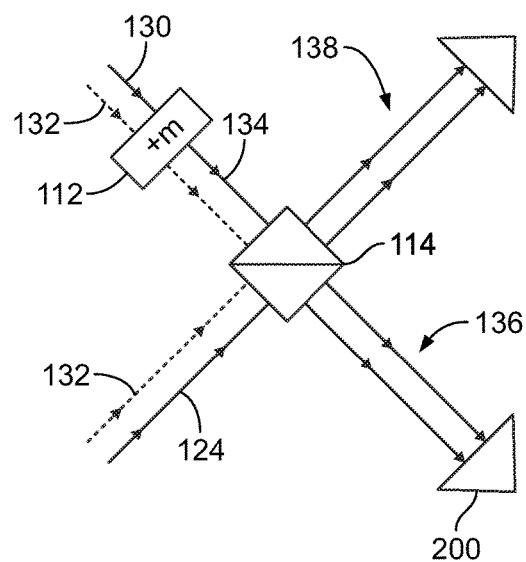
FIG. 2 illustrates a schematic diagram of a photon adder in relation to a beamsplitter and signal detectors, according to an embodiment of the present disclosure.

FIG. 2 illustrates a schematic diagram of the photon adder 112 in relation to the beamsplitter 114, the signal detector 118, and an additional signal detector 200 in place of the dump 116 (shown in FIG. 1), according to an embodiment of the present disclosure. The return signal 130 is a weak coherent beam having a frequency $\omega_2$, while the reference signal 124 is a stronger coherent beam having a frequency $\omega_1$. In a homodyne system, $\omega_1=\omega_2$. The photon adder 112 adds one or more photons to the return signal 130 to form the combined signal 134, as described above. The combined signal 134 and the reference signal 124 are mixed by the beamsplitter 114. Quantum or vacuum noise 132 is also present. The signal detectors 118 and 200 may be photon counting detectors, as noted above.

Figure 3:
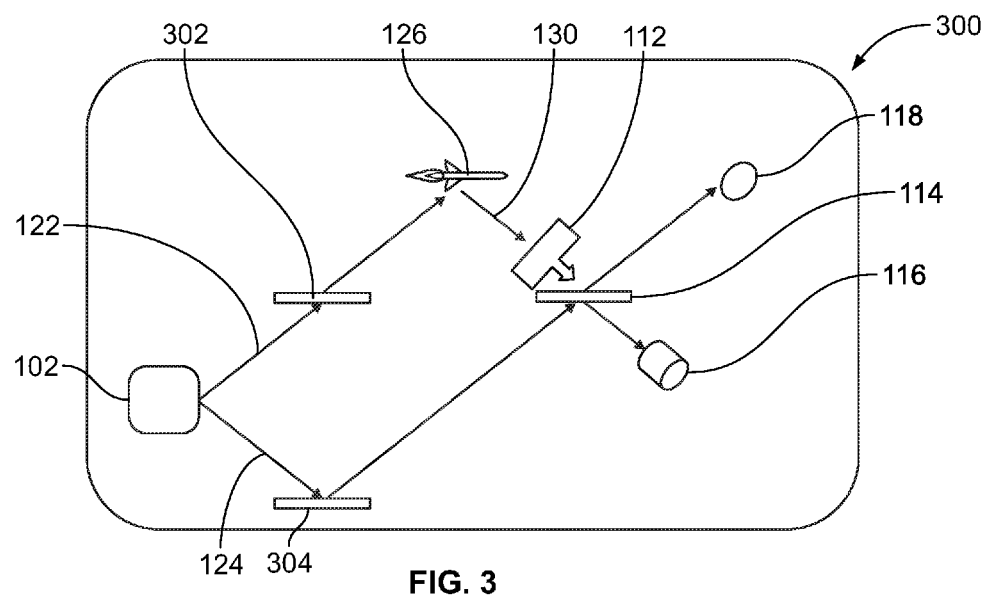
FIG. 3 illustrates a schematic diagram of a quantum signal detection system, according to an embodiment of the present disclosure.

FIG. 3 illustrates a schematic diagram of a quantum signal detection system 300, according to an embodiment of the present disclosure. The quantum signal detection system 300 is similar to the quantum signal detection system 100. The system 300 may include the beamsplitter 114, as described above, as well as an additional beamsplitter 302. The transmit signal 122 passes through the beamsplitter 302 before encountering the target 126. The reference signal 124 emitted by the signal source 102 may reflect off a mirror 304 towards the beamsplitter 114.

Referring to FIGS. 1-3, embodiments of the present disclosure may utilize at least one beam splitter. For example, the systems may include the beamsplitter 114. Additional beamsplitters may also be used.

Figure 4:
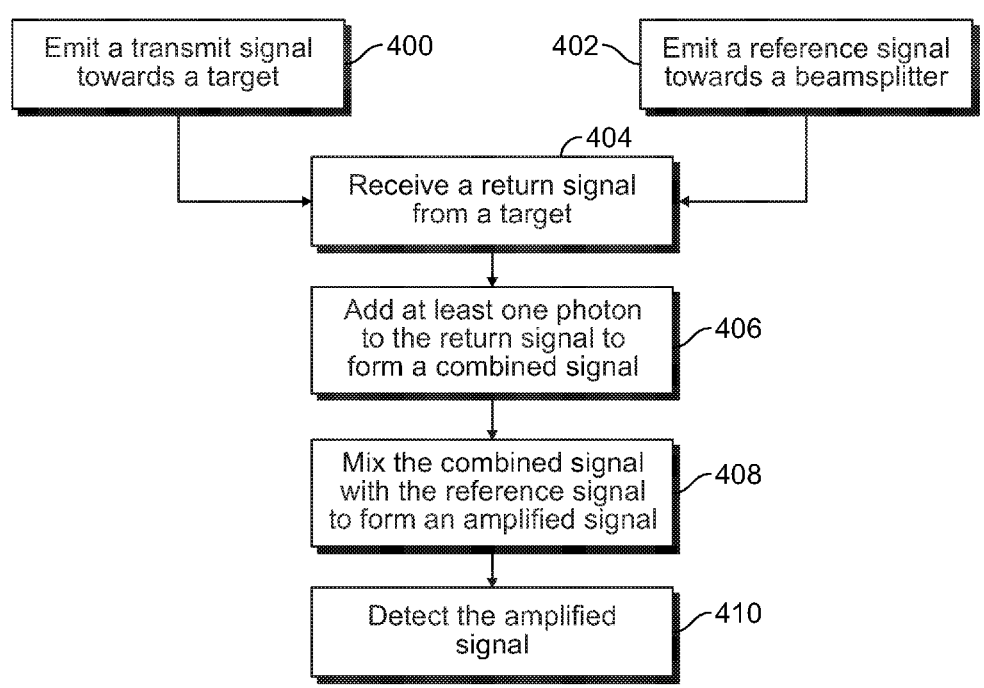
FIG. 4 illustrates a flow chart of a method of increasing a signal to noise ratio of a return signal from a target, according to an embodiment of the present disclosure.

FIG. 4 illustrates a flow chart of a method of increasing a signal to noise ratio of a return signal from a target, according to an embodiment of the present disclosure. At 400, a transmit signal is emitted towards the target. At 402, a reference signal is emitted towards a beamsplitter. The transmit and reference signals may be emitted by a single signal source, such as a coherent laser source. The transmit signal and the reference signals may be concurrently emitted. Alternatively, the transmit signal may be emitted before or after the reference signal is emitted.

At 404, a return signal is received from the target. The return signal is weaker than the transmit signal due to the distance to the target and the scattering of the transmit signal by the target.

At 406, at least one photon is added to the return signal to form a combined signal. At 408, the combined signal is mixed with the reference signal (such as by the beamsplitter) to form an amplified signal. At 410, the amplified signal is detected, such as by one or more signal detectors.

Figure 5:
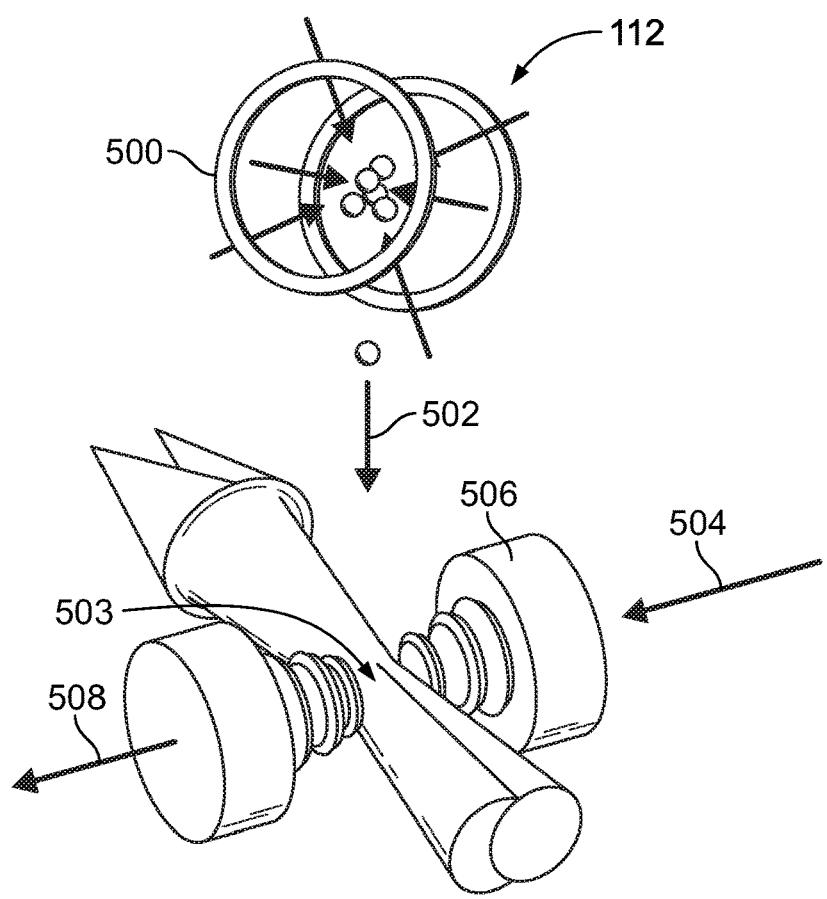
FIG. 5 illustrates a schematic view of a photon adder, according to an embodiment of the present disclosure.

FIG. 5 illustrates a schematic view of a photon adder 112, according to an embodiment of the present disclosure. It is to be understood that the photon adder 112 shown and described with respect to FIG. 5 is merely an example. Various other types of photon adders may be used.

The photon adder 112 may include a magneto-optical trap 500. An atom 502, such as a Rubidium ($^{85}Rb$) atom, may be released from the trap 500 and drop o or otherwise move into a region 503 where an input beam 504 is focused, such as by a lens 506. In the region 503, the atom 502 is transferred between hyperfine states and by a Raman process involving transient virtual excitation followed by a downward transition corresponding to the addition of a photon in an output beam 508. The interaction time may be defined by the speed of the atom 502 (for example, 2 m/s), focal region size (for example, 1-6 m), and the Raman process.

Figure 6:
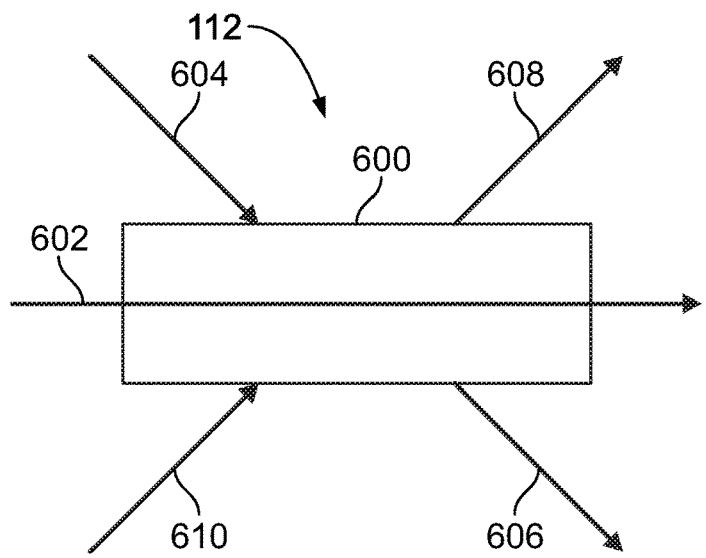
FIG. 6 illustrates a schematic view of a photon adder, according to an embodiment of the present disclosure.

FIG. 6 illustrates a schematic view of a photon adder 112, according to an embodiment of the present disclosure. Again, it is to be understood that the photon adder 112 shown and described with respect to FIG. 6 is merely an example. Various other types of photon adders may be used.

The photon adder 112 may use a parametric downconversion process in a non-linear optical crystal 600. In at least one embodiment, the non-linear optical crystal 600 may be formed of barium borate. In the parametric downconversion process, a photon from a pump laser may generate a pair of photons, each of which may be in a downconverted beam. In response, a photon is added to an input beam 604, thereby yielding a photon-added input beam 606. The efficiency of the parametric downconversion process may be monitored via the beam 606, or a beam 608 that is output in relation to a vacuum input beam 610.

As described above, the addition of the photon(s) to the return signal improves the signal to noise ratio of the return signal. Embodiments of the present disclosure provide quantum signal detection systems and methods having increased resolution. Accordingly, embodiments of the present disclosure may be employed to detect positions and movement of targets over greater distances than previously known systems and methods.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A quantum signal detection system configured to detect a target, the quantum signal detection system comprising:
   a signal source configured to emit a reference signal, and wherein the signal source is configured to emit a transmit signal towards the target;
   a photon adder that is configured to add at least one photon to a return signal that reflects from the target to form a combined signal, wherein the combined signal increases a signal to noise ratio of the return signal; and
   a beamsplitter that is configured to mix the combined signal with the reference signal, wherein the transmit signal and the reference signal are mutually coherent.

2. The quantum signal detection system of claim 1, wherein the transmit signal comprises a homodyne transmit signal.

3. The quantum signal detection system of claim 1, wherein the transmit signal comprises a heterodyne transmit signal.

4. The quantum signal detection system of claim 1, wherein the transmit signal comprises a coherent laser signal.

5. The quantum signal detection system of claim 1, wherein the transmit signal comprises a coherent radio frequency signal.

6. The quantum signal detection system of claim 1, wherein the photon adder comprises a parametric amplifier or downconverter.

7. The quantum signal detection system of claim 1, wherein the photon adder comprises a cavity having one or more atoms that are configured to interact with the return signal.

8. The quantum signal detection system of claim 1, wherein the photon adder is disposed between a mirror and the beamsplitter.

9. The quantum signal detection system of claim 1, wherein the photon adder is disposed between the beamsplitter and a signal detector.

10. The quantum signal detection system of claim 1, wherein the photon adder is disposed between two mirrors.

11. A quantum signal detection method of detecting a target, the quantum signal detection method comprising:
    emitting a transmit signal from a signal source towards the target;
    emitting a reference signal from the signal source;
    receiving a return signal that is reflected from the target;
    adding at least one photon to the return signal to form a combined signal, wherein the adding operation increases a signal to noise ratio of the return signal; and
    mixing the combined signal with the reference signal.

12. The quantum signal detection method of claim 11, wherein the transmit signal comprises one of a homodyne or heterodyne transmit signal.

13. The quantum signal detection method of claim 11, wherein the transmit signal comprises one of a coherent laser signal or a coherent radiofrequency signal.

14. The quantum signal detection method of claim 11, wherein the adding operation comprises adding the at least one through a parametric amplifier or downconverter.

15. The quantum signal detection method of claim 1, wherein the adding operation comprises adding the at least one photon through a cavity having one or more atoms that interact with the return signal.

16. A quantum signal detection system configured to detect a target, the quantum signal detection system comprising:
    a signal source configured to emit a homodyne or heterodyne transmit signal towards the target, wherein the signal source is configured to emit a reference signal, and wherein the transmit signal and the reference signal are mutually coherent;
    a photon adder that is configured to add at least one photon to a return signal that reflects from the target to form a combined signal, wherein the combined signal increases a signal to noise ratio of the return signal, wherein the photon adder comprises one or more of a parametric amplifier, downconverter, or a cavity having one or more atoms that are configured to interact with the return signal;
    a beamsplitter that is configured to mix the combined signal with the reference signal to form an amplified signal;
    at least one signal detector that is configured to detect at least a portion of the amplified signal.

17. The quantum signal detection system of claim 1, wherein the reference signal is a fraction of a strength of the transmit signal.

18. The quantum signal detection system of claim 1, wherein the reference signal is 10% or less of a strength of the transmit signal.

19. The quantum signal detection method of claim 11, wherein the reference signal is a fraction of a strength of the transmit signal.

20. The quantum signal detection method of claim 11, wherein the reference signal is 10% or less of a strength of the transmit signal.

* * * * *